United States Patent [19]

Shimbara

[11] Patent Number: 4,995,091
[45] Date of Patent: Feb. 19, 1991

[54] METHOD OF AND APPARATUS FOR DETECTING OBJECTS IN AN ASSEMBLY LINE

[75] Inventor: Yoshimi Shimbara, Hiroshima, Japan

[73] Assignee: Mazda Motor Manufacturing (USA) Corporation, Flat Rock, Mich.

[21] Appl. No.: 426,231

[22] Filed: Oct. 25, 1989

[51] Int. Cl.[5] ............................................. G06K 9/38
[52] U.S. Cl. ........................................ 382/50; 382/51
[58] Field of Search ....................... 382/50, 51, 52, 37

[56] References Cited

U.S. PATENT DOCUMENTS

| | | | |
|---|---|---|---|
| 3,676,847 | 7/1972 | Partin | 382/50 |
| 3,715,724 | 2/1973 | Demonte et al. | 382/51 |
| 4,345,314 | 8/1982 | Melamud et al. | 382/51 |
| 4,491,962 | 1/1985 | Sakou et al. | 382/50 |
| 4,742,556 | 5/1988 | Davis, Jr. et al. | 382/51 |

*Primary Examiner*—Leo H. Boudreau
*Assistant Examiner*—David Fox
*Attorney, Agent, or Firm*—Wenderoth, Lind & Ponack

[57] ABSTRACT

A method and apparatus for identifying marking holes in an object moving along a conveyor or the like, in which television image signals of the identifying marking holes are classified into signals above and below a threshold level voltage and then made into a monochrome image of the identifying marking holes which is then compared with a pre-memorized image of the marking hole. The invention involves a particular way of selecting the threshold level voltages by using a threshold level voltage from among threshold level voltages used to identify the marking holes in preceding objects according to the frequency of occurrence of the threshold level voltages, and for the threshold level voltage of the second identifying marking hole, initially calculating a target threshold level voltage, and then modifying it if necessary by reference to threshold level voltages used to identify the second marking hole in preceding objects, so as to make the identification of the second hole quicker.

8 Claims, 5 Drawing Sheets

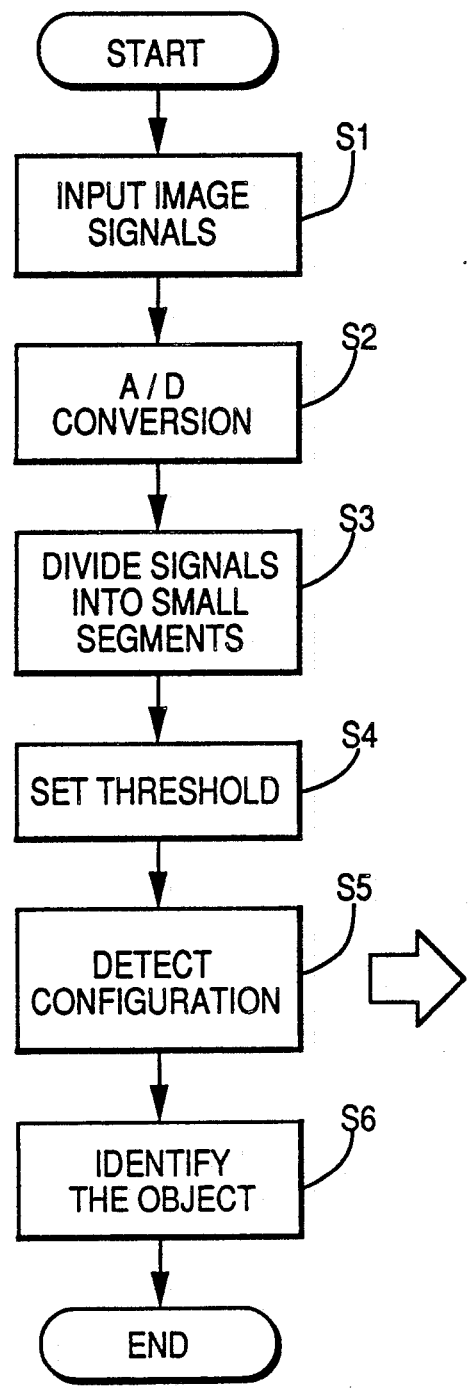
FIG. 3
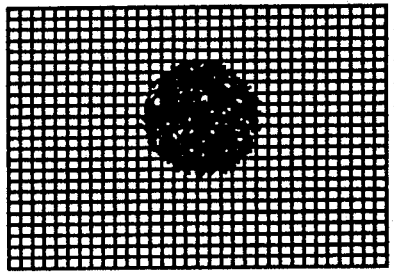

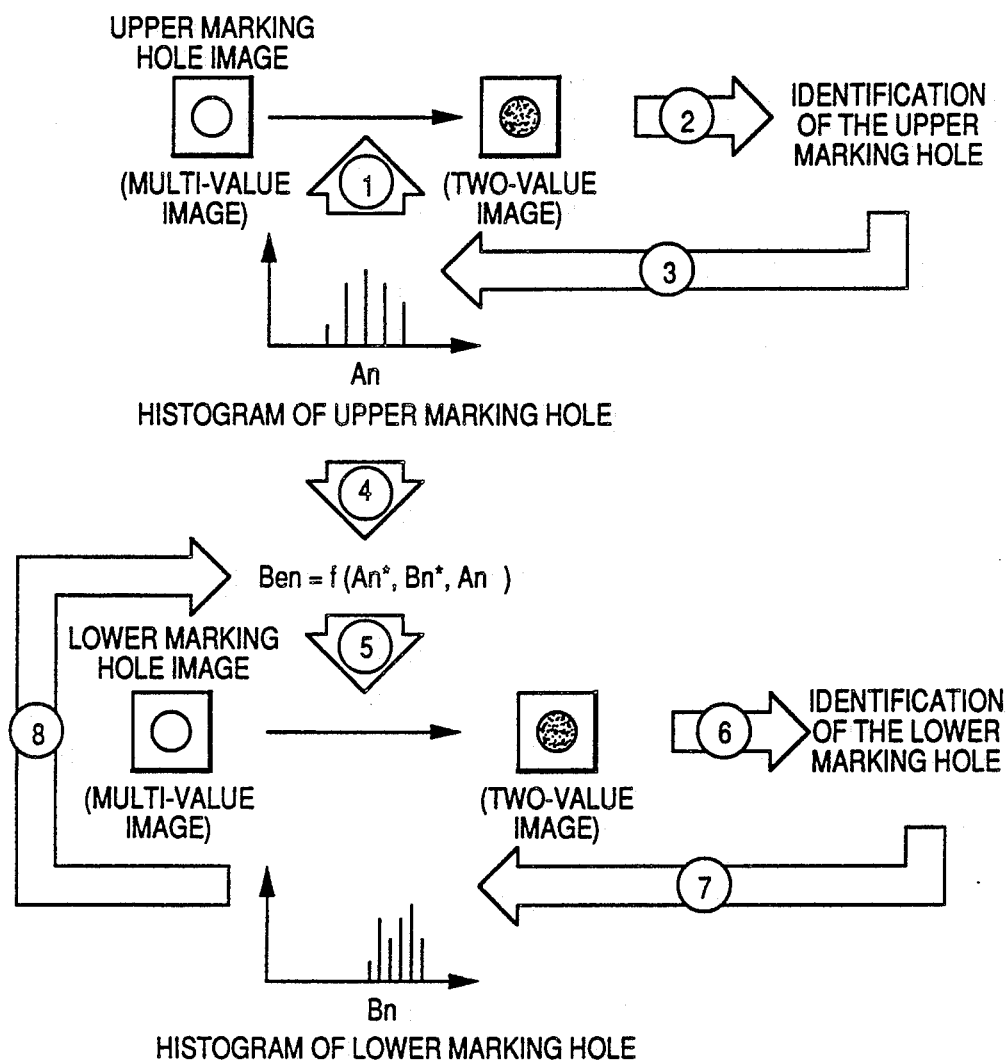
FIG. 4
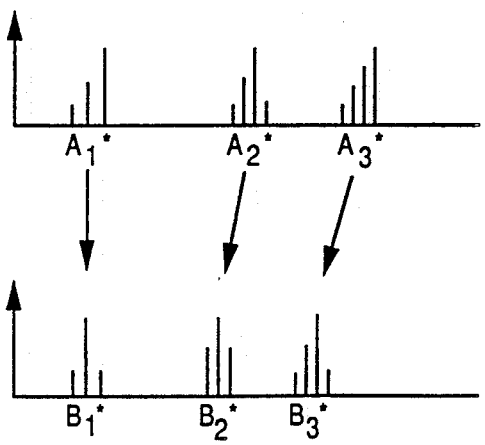
FIG. 5a
FIG. 5b

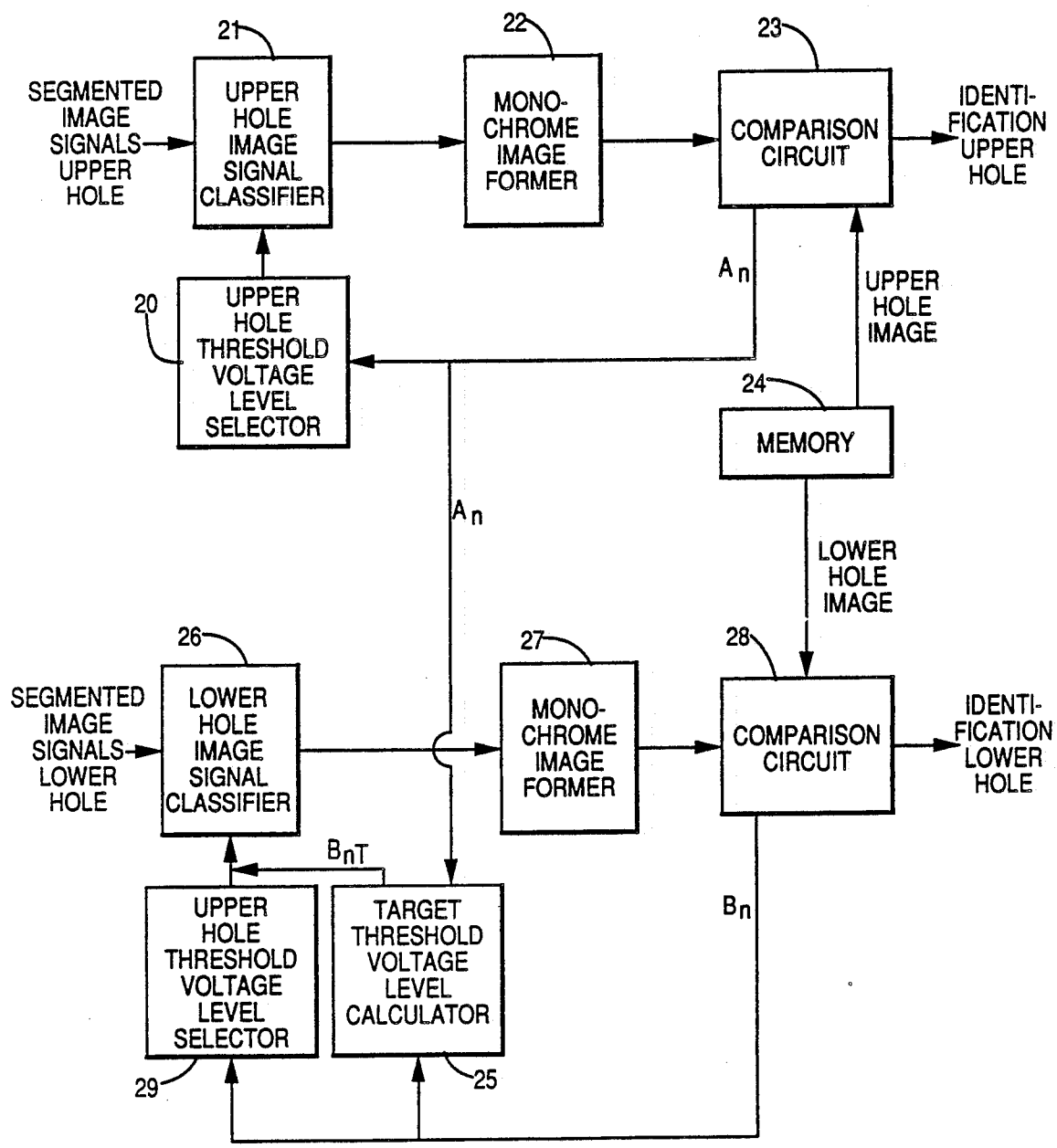

METHOD OF AND APPARATUS FOR DETECTING OBJECTS IN AN ASSEMBLY LINE

BACKGROUND OF THE INVENTION

1. Field of the Invention

This invention relates to a method of and apparatus for detecting the presence of objects moving along an assembly line, and more particularly relates to a method of and apparatus for detecting objects by using image analysis in which signals representing images received through a TV camera are processed or converted to values greater than and less than a threshold value, and then the thus converted signals are formed into a black and white image which is compared with a pre-memorized image to indicate that a certain object has been detected.

2. Description of the Prior Art

In a conventional way of detecting the presence of an object moving along an assembly line, for example, a rear door panel of a vehicle, image signals of a feature of the object, such as a hole or holes, from a TV camera are compared with a predetermined threshold value, and image signals having larger values than the threshold value are classified as or converted to white color signals, and the rest of the image signals are classified as or converted to black signals. By thus converting the signals with many different values to signals of only two values, a monochrome image is obtained. This monochrome image is compared with a pre-memorized image of the feature. The pre-memorized image has several characteristic features such as an area, a diameter, a circular configuration, etc. The detection of the objects is performed by identifying a viewed image most similar to the pre-memorized image of the identifying feature.

However, such a method sometimes encounters difficulty in accurately or immediately identifying the objects. This problem occurs particularly when some conditions under which the object is detected changes, such as for example, the color or configuration of the identifying feature, the brightness of lighting, and so on. Because these conditions are subject to change in actual practice this problem is a serious one.

This problem will be explained in greater detail with reference to FIGS. 1a–1c.

FIG. 1a shows a case in which the color of the area in which the feature, in this case a hole, is present is a bright color. The image signal of the bright color area has a high level of A1—A1'. The image signal of the hole has a low level of B1—B1'. The difference between these two levels is great. This means that proper setting of the threshold value is important or essential for accurate detection. The threshold value should be set to a level of S1—S1', in this case to give a hole image signal of B—B', to accurately identify the characteristic feature of the object, in this case the diameter of the circular image of the hole.

On the other hand, the threshold value of a level of S2—S2', is the ideal value for the case in which the color is a dark color, as shown in FIG. 1c. If this threshold value is used for a bright background, the feature in the light color area may be mistakenly identified as another feature, i.e., another hole having a smaller diameter B1—B1', see FIG. 1a. On the contrary, if the threshold value of S1—S1' is used where there is a dark color background, nothing will be detected as shown in FIG. 1b.

Therefore, the setting of the threshold value seriously affects the accuracy of detecting the objects by means of an image analysis.

To improve quality of the image analysis, Japanese Laid-Open Patent Application No. 62-180,204 of Aug. 7, 1987 proposes to detect the change of brightness of the lighting and to adjust the threshold level for the image analysis. However, such a system requires an additional sensor for detecting the brightness change. Moreover, it may not work in case of a color change of the object or mutual change of location between the TV camera and the object.

Moreover, where two features are used to give a clear identification of the object, where a first feature is identified by repeated comparisons of the black and white image of the first feature with the pre-memorized image, to repeat this effort for the second feature can be very time consuming, relatively speaking.

SUMMARY OF THE INVENTION

To overcome the above-described problem, it is the object of the present invention to provide a method and apparatus which is able to perform an accurate or immediate identification of the objects moving along an assembly line, such as an automobile assembly line, by identifying at least two features of the objects.

BRIEF DESCRIPTION OF THE DRAWINGS

FIG. 3 is a flow chart illustrating a general process of image analysis or image processing for identifying an object;

FIG. 4 is a diagram explaining the method of detecting an object, namely the rear door of a vehicle, on an assembly line in accordance with the present invention;

FIGS. 5a and 5b show relationship between histograms of an upper marking hole image and histograms of a lower marking hole image sensed under various conditions, i.e., a dark color condition, an intermediate color condition and a bright color condition;

FIG. 7 is a diagram of the image processing unit of FIG. 2 suitable for the method of the present invention.

DETAILED DESCRIPTION OF THE PRESENT INVENTION

Figure 1A:
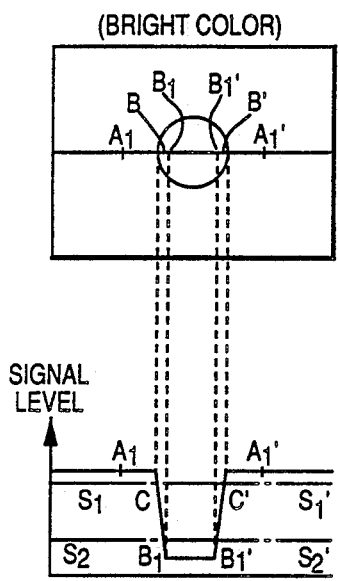
FIGS. 1a–1c are diagrams showing image signal levels and configurations of a hole provided in a rear door panel of a vehicle and which is to be identified, for illustrating the effect of setting a threshold level during detecting of the hole by image analysis.
Figure 1B:
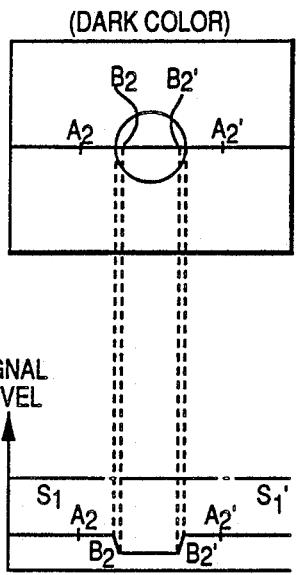
Figure 1C:
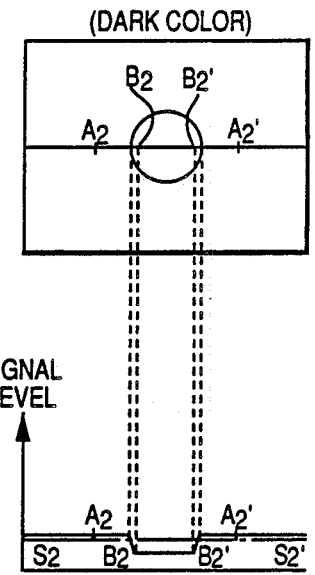

Referring now to the drawings, a preferred embodiment of the present invention is explained in detail. The method is described in connection with a vehicle body assembly line, and is especially useful with an automated assembly line where robots are used to assemble a vehicle body. However, it will be understood that the method can be used to identify any object moving along a line, such as an assembly line or a conveyor.

Figure 2:
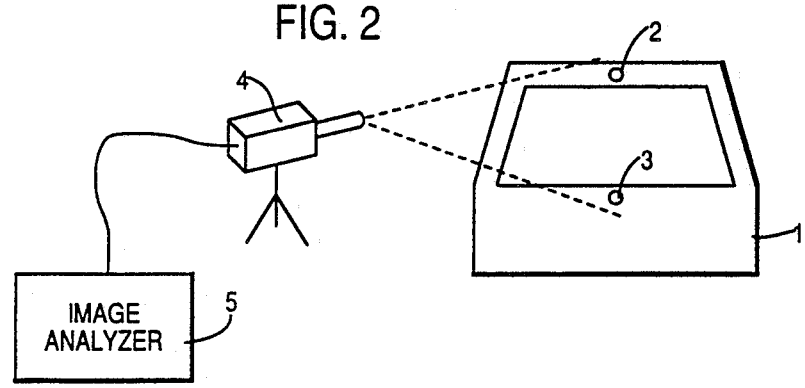
FIG. 2 is a schematic view showing a rear door of a vehicle having marking holes there, a TV camera provided along an assembly line for receiving an image of the marking holes, and an image analysis or image processing unit.

In the preferred embodiment of the invention, an assembly part such as a rear door is provided with at least two indicating or identifying features thereon. By detecting the plurality of features, the part can be correctly identified. As shown in FIG. 2, the rear door 1 has two holes as indicating features, i.e., an upper hole 2 and a lower hole 3. A TV camera 4 is provided to receive images of the upper hole 2 and the lower hole 3. The TV camera 4 is connected to an image analysis unit or image processing unit 5. The image analysis or image processing unit 5 comprises a micro computer and performs image analysis or image processing for detecting the configuration or dimension of the images received by the TV camera 4.

FIG. 3 is a diagram for explaining in a general way the function of the image analysis unit or image processing unit. At first, image signals are received from the TV camera 4 (Step S1). The signals are processed by an A/D converter (Step S2), and are divided into small segments (for example 256 by 256) (Step S3). Then, a threshold level is set to classify the image signals into two values (Step S4), and a monochrome image having a darker area and a brighter area is obtained for use in detecting the configuration of the image of the marking hole viewed by the TV camera (Step S5). The geometric shape of this monochrome image is compared with previously memorized images of identifying features to be detected, and the image analysis or image processing is completed by the identification of the feature (Step S6).

As described above, the configuration of the monochrome image obtained by this type of image analysis or image processing differs depending on the value of the threshold level. Therefore, proper or adequate setting of the threshold level is very important since it greatly affects the precision with which the detected image is identified.

A preferred method to accomplish the precise or accurate setting of the threshold level for detecting two identifying features in accordance with the present invention is explained in detail in the following, with reference to the diagram of FIG. 4.

1. As step 1, input image signals of the upper marking hole 2 on a particular door n among a succession of doors are processed by an A/D converter (not shown). A threshold level for the signals for the upper marking hole 2 is then set. One preferable way of doing this is to make the threshold level equal to the voltage level of the signals the frequency count of which is highest in a histogram of the threshold level voltage of the upper marking hole which is a diagram of the threshold levels for respective upper holes vs. the number of threshold levels at the respective voltages. Such a histogram can be made up from the threshold level voltages $A_1$, $A_2$, $A_3$, etc. for successive upper holes. For the first door of the succession, the threshold voltage can be chosen from data accumulated previously for similar doors, can be determined experimentally, or can be arbitrarily set at some intermediate level of the voltages of the image signals. Using the thus established threshold level, the image signals of the hole obtained by the TV camera 4 are classified into signals of one of two values, for example, a white color signal and a black color signal, and a monochrome image of the hole is obtained using these signals.

2. As step 2, a search is made among pre-memorized images for an image corresponding to the image formed in step 1. If a similar image is not obtained, the parts of step one are repeated except that the threshold level from the histogram of the upper marking hole 2 which has already been obtained is changed. The change is accomplished by choosing the voltage level of the signals the frequency count of which is next lower than the frequency count of the signals used to establish the level used in carrying out of the parts of the previous step 1. Then, a search is again made among the pre-memorized images for an image corresponding to the monochrome image obtained using the changed threshold level. If the similar image is not found, the same procedure is repeated until a similar image is found.

3. As step 3, the threshold level at which the similar image is found among the pre-memorized images, which is designated as matching threshold voltage level "$A_n$", is added to the histogram of the matching threshold voltages for the upper marking hole 2.

4. As a fourth step, a target threshold level for the lower marking hole 3, which is expressed as "$B_{nt}$", is calculated. This threshold level "$B_{nt}$", can be calculated by using an average matching threshold level of the signals for a series of upper marking holes 2, which is expressed as $$"A_n{}^*", \text{ i.e. } A_n{}^* = \frac{A_1 + A_2 + \ldots A_n}{n} = \frac{\int_1^n A_n dn}{n},$$

an average matching threshold level of the signals for a series of lower marking holes 3, which is expressed as $$"B_{n-1}{}^*", \text{ i.e. } B_{n-1}{}^* = \frac{B_1 + B_2 + B_{n-1}}{n-1} = \frac{\int_1^{n-1} B_n dn}{n-1}$$

and the threshold level "$A_n$" from step 3. In other words, the threshold level "$B_{nt}$" is a function of "$A_n{}^*$", "$B_n{}^*$" and "$A_n$".

$$B_{nt} = f(A_n{}^*, B_{n-1}{}^*, A_n) \tag{1}$$

A value of "$B_{nt}$" for a particular series of doors is not available at the time of the calculation of "$B_{nt}$" for the initial door. Therefore, as a value of "$B_{nt}$" for the hole in the first door there can be used a pre-memorized estimated value, such as data obtained experimentally for use in this step. Examples of histograms for matching threshold voltages for marking holes in doors of different auto bodies are shown in FIG. 5a and 5b, the histograms of $A_1{}^*$ and $B_1{}^*$ being for a black colored body, the histograms of $A_2{}^*$ and $B_2{}^*$ being for a red colored body, and the histograms of $A_3{}^*$ and $B_3{}^*$ being for a white colored body. Table I shows practical values for average values for the matching threshold levels for the upper and lower holes. It is pointed out that these values are absolute values (ABS).

The expression for $B_{nt}$ set forth above is a general expression. A specific equation for determining a practical value of $B_{nt}$ is:

$$B_{nt} = \text{INT}[B_{n-1}{}^* - 0.3K1(B_{n-1}{}^* - A_n/8)] \tag{2}$$

where:

$$K1 = ABS(24/A_n - A_n{}^*) \tag{3}$$

TABLE I

| | PRACTICAL VALUE | | |
|---|---|---|---|
| n | $A_n{}^*$ | $B_n{}^*$ | Typical Body Color |
| 1 | 49 | 45 | Black |
| 2 | 55 | 50 | Red |
| 3 | 61 | 57 | White |

5. As a fifth step, using the threshold level "$B_{nt}$" from step 4, the input image signals of the lower marking hole 3 are classified into two kinds of signals to obtain a monochrome image of the lower marking hole similarly to the manner of obtaining the monochrome image of the upper marking hole.

6. As a sixth step, a search is made among pre-memorized images for an image corresponding to the image of the lower marking hole formed in step 5. If a similar image is not obtained, the parts of step five are repeated except that a new threshold level is chosen from the histogram for the lower marking hole 3 which has already been obtained. The new threshold level is the voltage level for signals of a particular frequency count, which level is next lower or next higher than the threshold level "$B_{nt}$" used in step 5. As the new threshold level, it is better to choose a threshold level lower than the value of "$B_{nt}$" in the previous step five. However, alternatively the value for the new threshold level can be chosen by reducing or increasing the previous value automatically. Then, a search is again made among the pre-memorized images for an image corresponding to the monochrome image obtained using the changed threshold level. If the similar image is not found, the same procedure is repeated until the similar image is found. At this point, the identity of the door with the upper marking hole and the lower marking hole has been completed.

7. As a seventh step, the threshold level at which the similar image is found among the pre-memorized images, which is designated matching threshold level voltage "$B_n$", is added to a histogram of the matching threshold level voltages for the lower hole.

8. As an eighth step, steps 1-3 are repeated for the upper hole 2 of door n+1 in the succession of doors, and a matching threshold level voltage $A_{n+1}$ is obtained and added to the histogram for the upper marking hole 2 of the succession of doors.

9. As a ninth step, the equation for obtaining the target value of the threshold voltage for the signals for the lower marking hole 3 in door n+1, which target valves can be expressed as $B_{(n+1)T}$, is recalculated using values which have been adjusted to take into account the matching threshold voltages $B_n$ and $A_{(n+1)}$. Equation (1) has new values of the terms as follows:

$$B_{(n+1)T} = f(A_{n+1}^*, B_n^*, A_n) \quad (4)$$

In other words, the function f ($A_n^*$, $B_n^*$, $A_n$) is adjusted as a result of the determination of a specific value $B_n$. In this form of the equation, $$A_{n+1}^* = \frac{A_1 + A_2 + \ldots A_n + A_{n+1}}{n}, \text{ and}$$

$$B_n^* = \frac{B_1 + B_2 + \ldots B_{(n-1)} + B_n}{n}$$

The specific equation using the new values becomes:

$$B_{(n+1)T} = INT[B_n^* - 0.3k1(B_n^* - A_{n+1/8})] \quad (5)$$

$$K_1 = ABS(24/A_{n+1} - A_{n+1}^*) \quad (6)$$

Figure 6:
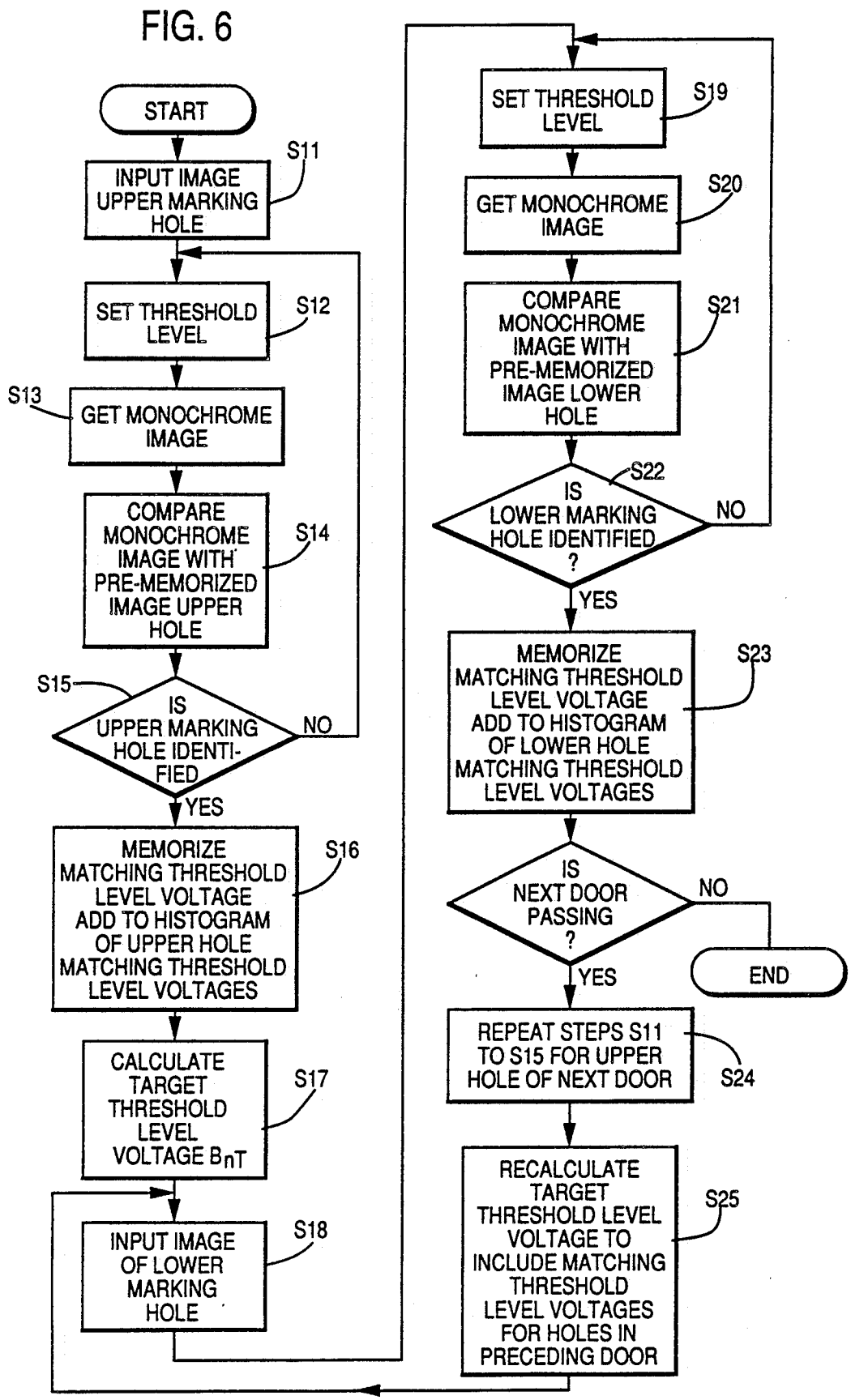
FIG. 6 is a flow chart showing the procedure in the image analysis in accordance with the present invention.

FIG. 6 shows a flow chart for programming the image analysis or image processing unit 5. In operation, at first, an image of the upper marking hole 2 in a particular door in the succession of doors is input in step S11. The image is divided into a plurality of segments such as 256×256 segments. The image signal level of each segment is detected. Then, in an upper threshold voltage level selector 20 as shown in FIG. 6, threshold level is set in step S12 in the manner described above in step 1 in connection with FIG. 4. Using this threshold value, in step 13 the image signals for the upper marking hole are then classified in an upper hole image signal classifier 21 into two types of signals, for example, a white signal and a black signal, and a monochrome image is obtained on a matrix such as a 256×256 matrix in a monochrome image former 22.

The thus obtained monochrome image is compared with a pre-memorized image corresponding to the upper marking hole 2 in a comparison circuit 23 in step S14. A determination is made whether or not the monochrome image corresponds with the pre-memorized image in step S15. If the monochrome image does not correspond t the pre-memorized image in step S15, steps S12, S13, S14 and S15 are repeated but with a changed threshold level, as described above in connection with step 2, until the obtained monochrome image corresponds to the pre-memorized image.

When the monochrome image corresponds to the pre-memorized image in step S15, the threshold level at which the monochrome image of the upper marking hole 2 corresponds to the pre-memorized image is memorized in memory 24 as threshold level "$A_n$" in step S16 and the histogram of the matching threshold voltage of the upper hole 12 is added to as in step 3 above. Then, a target threshold level "$B_{nt}$" for use in classifying the image signals for the lower marking hole 3 is calculated according to equation (1) in a target threshold voltage level calculator 25 in step S17. This is done in accordance with step 4 above, using equation (2).

Then, the image of the lower marking hole 3 is input in step S18, and the threshold level $B_{nt}$ from step 17 is set in step S19. In step S20, the image of the lower marking hole 3 is divided into a plurality of segments such as 256×256 segments. The image signal level of each segment is detected. Using the threshold value from step S19, image signals for the lower marking hole are then classified in lower hole image signal classifier 26 into two types of signals, for example, a white signal and a black signal and a monochrome image is obtained on a segments map such as 256 ×256 segments in a monochrome image former 27 as in step S5 above.

In step S21, the thus obtained monochrome image is compared in a comparison circuit 28 with a pre-memorized image corresponding to the lower marking hole 3 in the same way as in step 6 above. A determination is made whether or not the monochrome image corresponds to the pre-memorized image in step S22. If the monochrome image does not correspond to the pre-memorized image in step S22, steps S19, S20, S21 and S22 are repeated, but with a changed threshold level, obtained from the lower threshold voltage level selector 29 as described above in connection with FIG. 4, until the obtained monochrome image corresponds to the pre-memorized image of the lower marking hole. At this point, the identity of the door with the upper and lower marking holes has been completed.

When the monochrome image corresponds to the pre-memorized image in step S22, the threshold level at which this correspondence takes place is memorized as matching threshold level $B_n$ in step S23, and this is added to the histogram of the matching threshold voltages of the lower hole, as in step 7 above.

In next step S24, steps S11—S15 are repeated for the upper marking hole 2 in the next door in the succession and the threshold voltage $A_{n+1}$ is obtained and added to the histogram for the upper marking hole of the succession of doors. Then, in step S25, the equation used in step S17 for obtaining a target threshold level "$B_{(n+1)T}$" for the lower marking hole 3 is modified with the adjusted values $A_{n+1}$ and $B_n$ to equation (4).

Equation (4) is then used in the calculation in step S17 for choosing the target level $B_{nT}$ for the next holes which are to be sensed, i.e. $B_{(n+1)T}$, $B_{(n+2)T}$, etc. The equation $B_{nt}=f(A_n^*, B_{n+1}^*, A_n)$ is thus modified for each cycle of the computer program performed in the image analysis unit or image processing unit 5. Therefore, "$B_{(n+1)T}$", "$B_{(n+2)T}$", etc. in the next or future program flows is immediately and precisely calculated in accordance with the present invention.

It will be understood that while the invention has been described in connection with the detection of two identifying features, namely two holes, it can be readily expanded to the detection of more than two features.

In addition, while certain of the means in the image processing unit of FIG. 7 have been shown as provided for both the images for the upper and lower holes, such as the monochrome image formers 22 and 27 and the comparison circuits 23 and 28, single means for these functions could be provided and used in sequence. The appended claims are not intended to be limited to the specific arrangement shown.

The detection or identification of identifying features of an object, such as marking holes in an auto body door, is accomplished smoothly, accurately and quickly even if the conditions surrounding the object, such as vehicle body color, lighting or the mutual location of the TV camera and the object, are changed.

What is claimed is:

1. A method of detecting the presence of an object moving along an assembly line among a succession of objects and which objects have at least two identifying features thereon, comprising:

obtaining an image of the first identifying feature of one of the objects constituted by a plurality of voltage signals of more than two different voltages;
  choosing a first threshold level voltage for the first identifying feature of said one object;
  classifying the signals of said plurality of voltage signals for said first identifying feature of said one object into signals greater than the first threshold level voltage and signals less than the first threshold level voltage;
  forming from said thus classified signals a monochrome image;
  comparing said monochrome image with a pre-memorized image of the first identifying feature constituted by a plurality of voltage signals for determining whether the monochrome image corresponds to the pre-memorized image;
  when said image of said first identifying feature corresponds with the pre-memorized image, designating the threshold level voltage at which the correspondence occurs as matching threshold level voltage $A_n$;
  obtaining an image of the second identifying feature of said one object constituted by a plurality of voltage signals of more than two different voltages;
  calculating a target threshold level voltage $B_{nt}$ for the second identifying feature of said one object according the expression:

$$B_{nt}=f(A_n^*, B_{n-1}^*, A_n)$$

where $A_n^*$ is the average matching threshold level voltage for the first identifying features of preceding objects in the succession and $B_{n-1}^*$ is the average matching threshold level voltage for the second identifying features of the preceding objects in the succession;
  classifying the signals of said plurality of voltage signals for said second identifying feature into signals greater than the target threshold level voltage and signals less than the target threshold level voltage;
  forming from said thus classified signals a monochrome image of second identifying feature;
  comparing said monochrome image of the second identifying feature with a pre-memorized image of the second identifying feature constituted by a plurality of voltage signals for determining whether the monochrome image of the second identifying feature corresponds to the pre-memorized image of the second identifying feature;
  when said image of said second identifying feature corresponds with the pre-memorized image, designating the threshold level voltage at which correspondence occurs as matching threshold level voltage $B_n$;
  obtaining an image of the first identifying feature of the next succeeding object and carrying out the steps of choosing a first threshold level voltage, classifying the signals, forming the monochrome image, and comparing the image for the last-mentioned first identifying feature to obtain a matching threshold level voltage $A_{n+1}$ for said last mentioned first identifying feature,
  calculating a target threshold level voltage $B_{n+1)T}$ for the second identifying feature on said next succeeding object according to the expression:

$$B_{n+1)T}=f(A_{n+1}^*, B_n^*, A_{n+1})$$

where $A_{n+1}^*$ is the average matching threshold level voltage for the first identifying features of the succession of objects including matching threshold level voltage $A_{n+1}$, $B_n^*$ is the average matching threshold level voltage for the second identifying features of the succession of objects including matching threshold level voltage $B_n$; and
  obtaining an image of the second identifying feature of the next succeeding object and carrying out the steps of classifying the signals using the newly calculated target threshold level voltage, forming the monochrome image and comparing the image for the last mentioned second identifying feature.

2. A method as claimed in claim 1 in which said steps of choosing a first threshold level voltage, classifying and comparing comprise;
  initially choosing as a first threshold level voltage a voltage from among a voltage based on past experience and a voltage determined experimentally; and
  when the determination in said comparison step of comparing the monochrome image of the first identifying feature with the pre-memorized image of the first identifying feature shows that the monochrome image of the first identifying feature does not correspond to the pre-memorized image of the first identifying feature, choosing a further first threshold level voltage corresponding to a matching threshold level voltage for first identifying features for preceding objects in the succession of objects;

classifying the signals of said plurality of voltage signals for the first identifying feature into signals greater than the newly chosen further first threshold level voltage and signals less than the newly chosen further first threshold level voltage;

forming from said thus classified signals a monochrome image of the first identifying feature;

comparing the thus obtained image with said pre-memorized image of the first identifying feature for determining whether the monochrome image obtained with the further first threshold level voltage corresponds to the pre-memorized image of the first identifying feature; and when the last mentioned comparison shows that the monochrome image obtained with the further first threshold level voltage does not correspond to the pre-memorized image, repeating the further first threshold level voltage choosing step, the classifying step, the image forming step and the comparison step until the monochrome image obtained corresponds with the pre-memorized image of the first identifying feature.

3. A method as claimed in claim 2 in which the step of choosing the further first threshold level voltage comprises choosing the threshold level voltage of the matching threshold voltages which occur with the greatest frequency among said matching threshold voltage levels for the first identifying feature for preceding objects, and the step of repeating the further first threshold level voltage choosing step comprises choosing the threshold level voltage of the matching threshold voltages which occur with the next greatest frequency among said matching threshold level voltages for the first identifying feature for the preceding objects.

4. A method as claimed in claim 2 further comprising:

when the determination in said comparison step of comparing the monochrome image of the second identifying feature with the pre-memorized image of the second identifying feature shows that the monochrome image of the second identifying feature does not correspond to the pre-memorized image of the second identifying feature, choosing a second threshold level voltage corresponding to a matching threshold level voltage for second identifying features of preceding objects in the succession of objects and which voltage is the next adjacent said target threshold level voltage;

classifying the signals of said plurality of voltage signals into signals greater than the newly chosen second threshold level voltage and signals less than the newly chosen second threshold level voltage;

forming from said thus classified signals a monochrome image of the second identifying feature;

comparing the thus obtained image of the second identifying feature with said pre-memorized image of the second identifying feature for determining whether the monochrome image of the second identifying feature corresponds to the pre-memorized image of the second identifying feature; and when the last mentioned comparison shows that the monochrome image of the second identifying feature does not correspond to the pre-memorized image of the second identifying feature, choosing a further second threshold level voltage and repeating the classifying step, the image forming step and the comparison step until the monochrome image of the second identifying feature corresponds with the pre-memorized image of the second identifying feature.

5. A method as claimed in claim 4 in which the next adjacent threshold level voltage is the next higher adjacent threshold level voltage.

6. A method as claimed in claim 4 in which the next adjacent threshold level voltage is the next lower adjacent threshold level voltage.

7. A method as claimed in claim 4 in which the step of choosing the further second threshold level voltage comprises choosing the threshold level voltage among the matching threshold level voltages which occurs with the next greatest frequency to the matching threshold level voltage chosen for said second threshold level voltage.

8. An apparatus for detecting the presence of an object moving along an assembly line among a succession of objects and which objects have at least two identifying features thereon, comprising:

means for obtaining an image of the first identifying feature of one of the objects constituted by a plurality of voltage signals of more than two different voltages;

means for choosing a first threshold level voltage for the first identifying feature of said one object;

means for classifying the signals of said plurality of voltage signals for said first identifying feature of said one object into signals greater than the first threshold level voltage and signals less than the first threshold level voltage;

means for forming from said thus classified signals a monochrome image;

means for comparing said monochrome image with a pre-memorized image of the first identifying feature constituted by a plurality of voltage signals for determining whether the monochrome image corresponds to the pre-memorized image, and when said image of said first identifying feature corresponds with the pre-memorized image, designating the threshold level voltage at which the correspondence occurs as matching threshold level voltage $A_n$;

means for obtaining an image of the second identifying feature of said one object constituted by a plurality of voltage signals of more than two different voltages;

means for calculating a target threshold level voltage $B_{nt}$ for the second identifying feature of said one object according to the expression:

$$B_{nt} = f(A_n^*, B_{n-1}^*, A_n)$$

where $A_n^*$ is the average matching threshold level voltage for the first identifying features of preceding objects in the succession and $B_{n-1}^*$ is the average matching threshold level voltage for the second identifying features of the preceding objects in the succession;

means for classifying the signals of said plurality of voltage signals for said second identifying feature into signals greater than the target threshold level voltage and signals less than the target threshold level voltage;

means for forming from said thus classified signals a monochrome image of second identifying feature;

means for comparing said monochrome image of the second identifying feature with a pre-memorized image of the second identifying feature constituted by a plurality of voltage signals for determining whether the monochrome image of the second identifying feature corresponds to the pre-memorized image of the second identifying feature, and when said image of said second identifying feature corresponds with the pre-memorized image, designating the threshold level voltage at which correspondence occurs as matching threshold level voltage $B_n$;

means obtaining an image of the first identifying feature of the next succeeding object and for carrying out the steps of choosing a first threshold level voltage, classifying the signals, forming the monochrome image, and comparing the image for the last mentioned first identifying feature to obtain a matching threshold level voltage $A_{n+1}$ for said last mentioned first identifying feature, means for calculating a target threshold level voltage $B_{(n-1)T}$ for the second identifying feature on said next succeeding object according to the expression:

$$B_{n+1)T} = f(A_{n+1}^*, B_n^*, A_{n+1})$$

where $A_{n+1}^*$ is the average matching threshold level voltage for the first identifying features of the succession of objects including matching threshold level voltage $A_{n+1}$, $B_n^*$ is the average matching threshold level voltage for the second identifying features of the succession of objects including matching threshold level voltage $B_n$; and means for obtaining an image of the second identifying feature of the next succeeding object and carrying out the steps of classifying the signals using the newly calculated target threshold level voltage, forming the monochrome image and comparing the image for the last mentioned second identifying feature.

* * * * *